United States Patent
Kalygin

(10) Patent No.: US 10,199,955 B2
(45) Date of Patent: Feb. 5, 2019

(54) ELECTRICAL CONVERTER AND CONTROL METHOD

(71) Applicant: ABB Technology Oy, Helsinki (FI)

(72) Inventor: Andrey Kalygin, Wuerenlingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/975,045

(22) Filed: May 9, 2018

(65) Prior Publication Data

US 2018/0262123 A1 Sep. 13, 2018

Related U.S. Application Data

(63) Continuation of application No. PCT/EP2016/076861, filed on Nov. 7, 2016.

(30) Foreign Application Priority Data

Nov. 9, 2015 (EP) ..................................... 15193639

(51) Int. Cl.
*H02M 7/49* (2007.01)
*H02M 5/458* (2006.01)
(Continued)

(52) U.S. Cl.
CPC ........... *H02M 7/49* (2013.01); *H02M 5/4585* (2013.01); *H02M 7/5387* (2013.01); *H02M 2001/0025* (2013.01); *H02M 2001/0067* (2013.01)

(58) Field of Classification Search
CPC ............ H02M 7/06; H02M 7/18; H02M 7/49; H02M 7/153; H02M 7/1623;
(Continued)

(56) References Cited

U.S. PATENT DOCUMENTS 5,625,545 A 4/1997 Hammond
5,986,909 A 11/1999 Hammond et al.
(Continued)

FOREIGN PATENT DOCUMENTS

WO 2015/113780 A1 8/2015

OTHER PUBLICATIONS

European Patent Office, International Search Report & Written Opinion issued in corresponding international application No. PCT/EP2016/076861, dated Feb. 2, 2017, 9 pp.
(Continued)

*Primary Examiner* — Yemane Mehari
(74) *Attorney, Agent, or Firm* — J. Bruce Schelkopf; Taft Stettinius & Hollister LLP

(57) ABSTRACT

An electrical multi-phase converter and method for controlling an electrical multi-phase converter is disclosed. In one form a method provides for controlling the electrical multi-phase converter comprises: determining at least two supply voltages for the at least two converter cells of the at least two phase branches; determining a potential zone for each phase branch based on the at least one supply voltage of the at least one converter cell of the phase branch, the potential zone bounding a possible actual phase voltage producible by the phase branch; receiving a reference voltage for each phase branch; and, if the reference voltage for a phase branch is not within the potential zone of the phase branch, setting the reference voltage to a bound of the potential zone and shifting reference voltages of other phase branches, wherein the reference voltages are set and shifted such that a minimal common mode voltage between the output voltages of the multi-phase converter is generated.

20 Claims, 2 Drawing Sheets

(51) Int. Cl.
*H02M 7/5387* (2007.01)
*H02M 1/00* (2006.01)

(58) Field of Classification Search
CPC .... H02M 7/5387; H02M 3/156–3/158; H02M 3/1584; H02M 3/285; H02M 3/33561; H02M 1/0845; H02M 5/4585; H02M 2001/0025; H02M 2001/0067; Y02B 70/126
USPC ............... 363/65, 67, 69, 70, 71, 77, 84, 87
See application file for complete search history.

(56) References Cited

U.S. PATENT DOCUMENTS

| | | |
|---|---|---|
| 2013/0148397 A1 | 6/2013 | Schroeder et al. |
| 2014/0078797 A1 | 3/2014 | Mihalache |

OTHER PUBLICATIONS

European Patent Office, European Search Report issued in corresponding European application No. 15193639.0, dated May 19, 2016, 8 pp.

P. Correa et al., "Modulation Strategies for Fault-Tolerant Operation of H-Bridge Multilevel Inverters", 2006 IEEE International Symposium on Industrial Electronics.

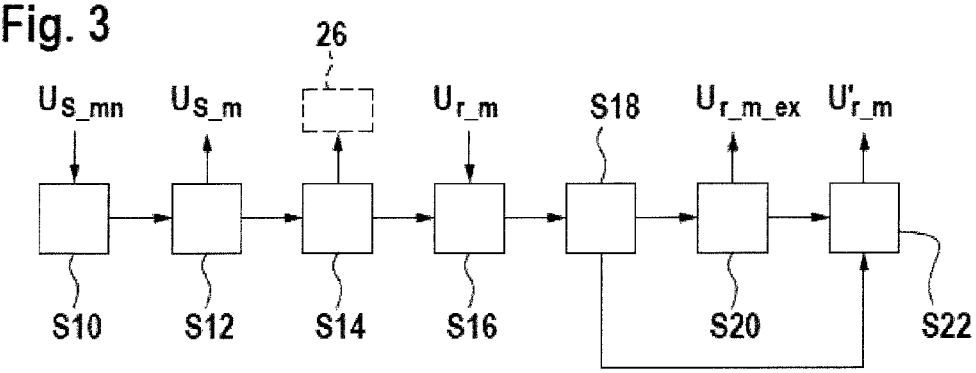
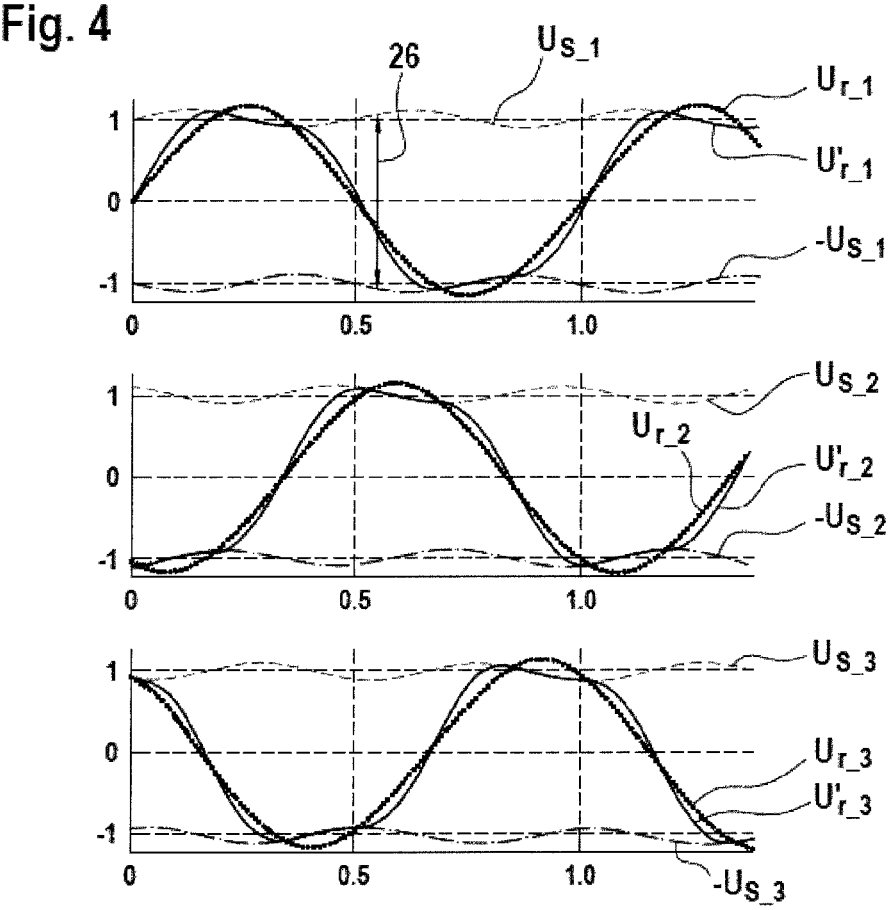

ELECTRICAL CONVERTER AND CONTROL METHOD

FIELD OF THE INVENTION

The invention relates to the field of control of high power converters. In particular, the invention relates to a method for controlling an electrical multi-phase converter. Furthermore, the invention relates to a controller and to an electrical multi-phase converter.

BACKGROUND OF THE INVENTION

An electrical multi-phase converter, i.e. a converter adapted for providing more than one output phase to a load, comprises phase branches, which may be individually switched to generate the respective output voltage for each phase. The phase branches may be assembled of converter cells that may have individual power supplies, for example individual DC links that are supplied by a rectifier per each converter cell.

For example, due to the power drawn from the DC links by the converter cells, which may vary due to the switching scheme of the converter cells, also the DC link voltage and in general the supply voltage of each converter cell may vary over time. In the case a reference voltage of a phase branch is very high and the available supply voltages are very low, the phase branch is not any more able to generate an output voltage as high as the reference voltage.

U.S. Pat. No. 5,625,545 shows an electrical drive, which provides three output phases. Each output phase is generated by series-connected converter cells.

In US 2013/148397 A1, a method is shown, in which reference output voltages are symmetrized within available potential zones of voltage sources. The symmetrizing common mode voltage is always added to the references even if none of the reference output voltages exceeds its potential zone.

"Modulation Strategies for Fault-Tolerant Operation of H-Bridge Multilevel Inverters", P. Correa et al, 2006 IEEE International Symposium on Industrial Electronics deals with fault conditions in a converter with series connected converter cells.

US 2014/0078797 A1 relates to control of a cascaded multi-level converter in the case of a fault. A reference voltage is altered based on the number of active cells.

WO 20015/113780 A1 relates to switching of an inverter, which comprises series-connected converter cells. In the case of differing maximal amplitudes of the phase voltages, a virtual star point of the output voltages is shifted.

DESCRIPTION OF THE INVENTION

It is an objective of the invention to better utilize available input voltages of a multicellular converter, while only producing low common mode voltage at the output of the converter.

This objective is achieved by the subject-matter of the independent claims. Further exemplary embodiments are evident from the dependent claims and the following description.

An aspect of the invention relates to a method for controlling an electrical multi-phase converter. The method may be performed automatically by a controller of the converter.

The electrical multi-phase converter may be a high power converter adapted for processing voltages of more than 1 kV and/or more than 100 A.

The electrical multi-phase converter may comprise at least two phase branches, wherein each phase branch comprises at least one converter cell supplied with a supply voltage, and each phase branch is adapted for providing an output voltage. Furthermore, each phase branch is adapted for converting at least one supply voltages provided by the at least one converter cell into the output voltage. For example, each phase voltage may be generated by one converter cell or by a plurality of converter cells interconnected in series with their outputs. Usually, the multi-phase converter may have two or three phase branches.

According to an embodiment of the invention, the method comprises: determining at least two supply voltages for the at least two converter cells of the at least two phase branches. For example, the supply voltage for each converter cell may be measured. Furthermore, the supply voltage may be a DC link voltage.

Each converter cell may comprise an inverter, which is adapted for converting a DC supply voltage (which may be provided by a DC link of the converter cell) into an AC output voltage. In the case of more than one converter cell per phase branch, the AC output voltages of the converter cells of the phase branch may add up to the output voltage of the respective phase branch.

Each converter cell may comprise a DC link, which may be supplied by a rectifier of the converter cell. The DC link voltage and in general the supply voltage may vary over time, since, depending on the switching state of the inverter, less or more power may be drawn from the DC link.

According to an embodiment of the invention, the method furthermore comprises: determining a potential zone for each phase branch based on the at least one supply voltage provided by the at least one converter cell of the phase branch, the potential zone bounding and/or indicating a possible extreme value of actual phase voltage producible by the phase branch. The potential zone may be defined by an interval having a lower bound (minimal potential zone voltage) and an upper bound (maximal potential zone voltage). The potential zone of a branch may be determined from the actual supply voltages, taking into consideration, how these supply voltages may contribute to the output voltage of the branch based on the possible switching states of the converter cell(s) of the branch.

According to an embodiment of the invention, the method furthermore comprises: receiving a reference voltage for each phase branch and, if the instantaneous value of the reference voltage for a phase branch is not within the potential zone of the phase branch, setting the reference voltage to a bound of the potential zone and shifting (further) reference voltages, such that a minimal common mode voltage between the output voltages of the multi-phase converter is generated.

The reference voltages of the phase branches may be provided by an outer control loop. In the case, the instantaneous value of the reference voltage of a branch violates a bound provided by the potential zone, this reference voltage is modified by shifting it back into the potential zone. For example, this may be done by setting the respective reference voltage to the violated bound (the upper or lower bound) of the potential zone. The other (further) reference voltages may be shifted in the same direction by the same value (up or down).

In particular, if all reference voltages stay within their potential zones, the reference voltages are not modified. In such a way, the references voltages, which may have been optimized to further goals, such as low total harmonic distortion, etc., are only modified, when the respective phase branch is not any more able to generate an output voltage as high as the demanded reference voltage.

According to the invention, the reference voltage is set to a bound of the potential zone and further reference voltages are shifted by: determining an excess voltage for the phase branch, the excess voltage being based on a difference between the reference voltage and a violated bound of the potential zone; and modifying the reference voltage for each phase branch by subtracting the excess voltage from the reference voltage of the phase branch. It may be tested for each phase branch, whether the respective reference voltage is inside or outside of the potential zone. In the case, the reference voltage is outside the potential zone, an excess voltage is determined, which may be the difference between the respective reference voltage and the violated bound of the potential zone. This excess voltage is then subtracted from all reference voltages, i.e. all reference voltages may be shifted by the same amount in the same direction.

According to an embodiment of the invention, for each phase branch, a maximal available voltage at the phase branch is determined from the at least one supply voltage provided by the converter cells of the phase branch, wherein the potential zone is bounded by the maximal available voltage, and the negated maximal available voltage. One possibility of determining the potential zone is to assume that the potential zone is symmetric to a point with 0 V and that the upper and lower bounds are determined by a voltage that may be provided either as positive voltage (maximal available voltage) or as negative voltage (negated maximal available voltage).

According to an embodiment of the invention, the electrical multi-phase converter comprises one converter cell per phase branch and the maximal available voltage for a phase branch is the absolute value of the supply voltage of the one converter cell of the phase branch.

According to an embodiment of the invention, the electrical multi-phase converter comprises more than one converter cell per phase branch, wherein the maximal available voltage for a phase branch is the sum of the absolute values of the supply voltages of the converter cells of the phase branch. For example, it may be assumed that every converter cell may provide the supply voltage either in a positive way or in a negated way to the phase branch. In this case, the maximal available voltage for the respective branch is the sum of the absolute values of all supply voltages.

According to an embodiment of the invention, the excess voltage is the difference between the reference voltage and the violated bound of the potential zone. In general, the excess voltage, i.e. the voltage with which the reference voltages may be shifted in the case of a violation of the potential zone, may be set to the difference between the reference voltage, which violates a bound and the violated bound. In the case, the bounds of the potential zone of a phase branch are symmetrically determined via a maximal available voltage and its negative value, the excess voltage may be calculated as the difference between the reference voltage and violated bound of the potential zone.

According to an embodiment of the invention, it is determined, whether the reference voltage for a phase branch is within the potential zone of the phase branch or not, by comparing, whether the reference voltage is smaller than a lower bound of the potential zone and/or greater than an upper bound of the potential zone. In general, the upper and lower bounds of the potential zone may be different. In this way, a bounds violation may be determined by comparing the reference voltage with both bounds of the potential zone.

According to an embodiment of the invention, the method further comprises: determining switching states of the converter cells based on the modified reference voltages, such that output voltages of the phase branches reproduce the modified reference voltages. It has to be understood that the reference voltage and also the modified reference voltage may be used for controlling semiconductor switches of the converter cells (and in particular inverters of the converter cells) such that the output voltages of the branches follow the respective (modified) reference voltages.

A further aspect of the invention relates to a controller for controlling an electrical converter, wherein the controller is adapted for performing the method as described in the above and in the following.

It has to be understood that features of the method as described in the above and in the following may be features of the controller and the converter as described in the above and in the following, and vice versa.

The controller may comprise a processor adapted for executing a computer program, which, when being executed on the processor, is adapted for performing the method. For example, the computer program may be stored on a non-volatile computer-readable medium in the controller.

Further aspects of the invention relate to such computer program and a computer-readable medium on which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

However, it also may be possible that the method is at least partially implemented in hardware in the controller, for example with a FPGA and/or DSP.

A further aspect of the invention relates to an electrical multi-phase converter, which comprises such a controller.

According to an embodiment of the invention, the multi-phase converter comprises at least two phase branches for providing an output voltage, and at least two converter cells for converting at least two supply voltages into at least two output voltages. For example, the converter may have one converter cell in each phase branch.

According to an embodiment of the invention, the electrical converter comprises more than one converter cell per phase branch, wherein the converter cells of the phase branch are series-connected at their outputs.

According to an embodiment of the invention, each converter cell comprises an H-bridge inverter. The converter cells may be bidirectional converter cells that are adapted for providing the supply voltage in two different directions to the phase branch.

According to an embodiment of the invention, each converter cell may comprise a rectifier and an inverter, which are interconnected by a DC link, which provides a DC supply voltage for the inverter. For example, the rectifiers of the converter cells may be supplied by an AC voltage, which, for example, may be provided by a transformer, which is connected to a large scale grid.

According to an embodiment of the invention, the phase branches are star-connected. In particular, branches of converter cells, which are series-connected at their output may be star-connected at one end and may provide the AC output voltages at the other end.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

FIG. 3 shows a flow diagram for a method for controlling an electrical multi-phase converter according to an embodiment of the invention.

FIG. 4 shows a diagram with voltages generated during a method for controlling an electrical multi-phase converter according to an embodiment of the invention.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
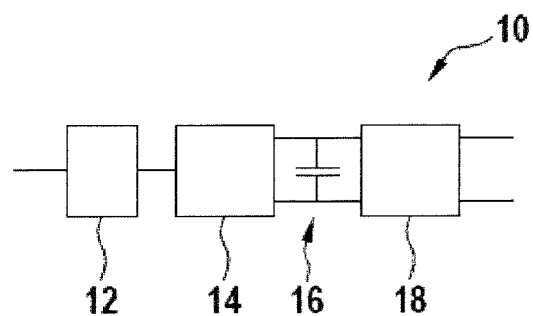
FIG. 1 schematically shows a converter cell for an electrical multi-phase converter according to an embodiment of the invention.

FIG. 1 schematically shows a converter cell 10, which may comprise a filter 12, a rectifier (input converter) 14, a DC link 16 and an inverter (output converter) 18.

The filter 12 and the rectifier 14 may be supplied with an AC input voltage, for example provided by a transformer, and may provide a DC supply voltage to the DC link. The DC link 16 may supply the inverter 18 with the DC supply voltage, which converts the DC supply voltage into an output voltage.

The inverter 18 may be of different topology, for example, it may be a voltage source converter and/or be based on an H-bridge (2-level, 3-level NPC etc.) converter.

Figure 2:
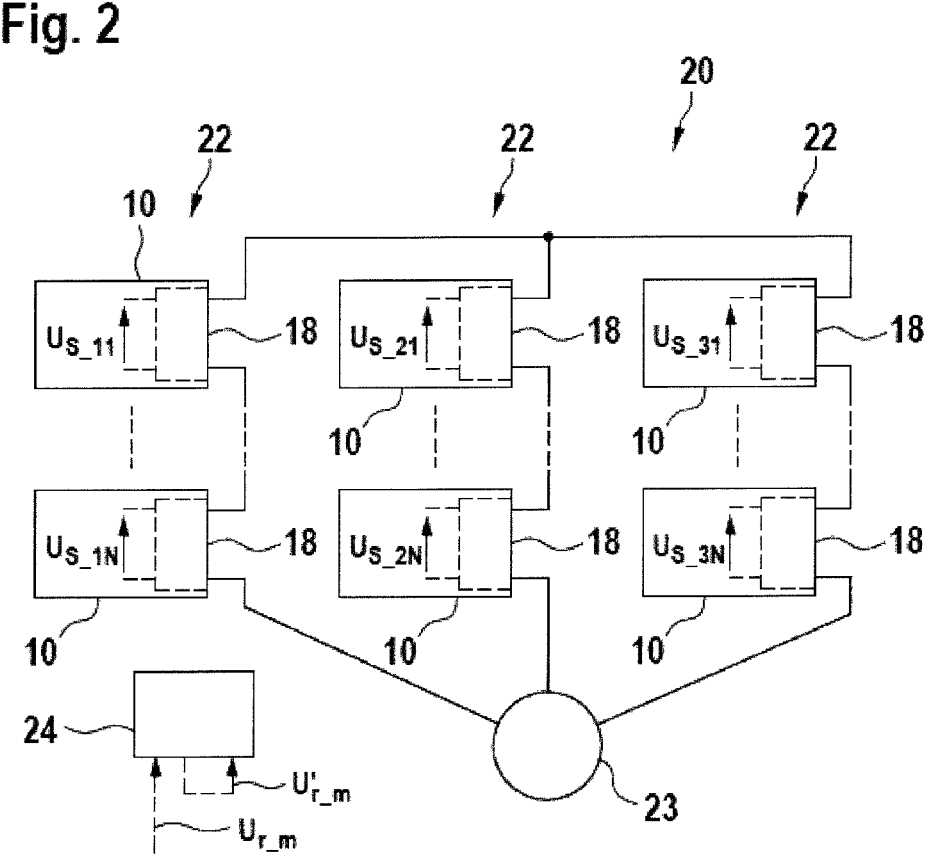
FIG. 2 schematically shows an electrical multi-phase converter according to an embodiment of the invention.

FIG. 2 schematically shows an electrical multi-phase converter 20, which comprises three phase branches 22, each of which comprises at least one converter cell 10. It is it possible that each phase branch 22 comprises more than one, i.e. at least two converter cells 10 per phase branch 22, i.e. the converter 20 may be a cascaded converter. The converter cells 10 of a phase branch 22 are series-connected at their outputs. In such a way, the output voltage of a phase branch 22 is the sum of the output voltages of the converter cells 10 of the respective phase branch 22. Alternatively, it is also possible that each phase branch 22 comprises only one converter cell 0.

At one end, the phase branches 22 are star-connected. At the other end, the phase branches 22 provide the output voltages to a load 23.

The converter cells 10 of FIG. 2 may be designed as the one shown in FIG. 1. However, in general, a converter cell 10 has an inverter 18, which is connected to a varying source of electric energy (such as a DC link 16, for example). These sources of electrical energy are independent from each other and/or may provide timely varying supply voltages $U_{S\_mn}$. The index m may be m=1, 2, 3, . . . , M, where M is the number of phases (here 3). The index n may be n=1, 2, . . . , N is the number of the converter cells 10 in a phase branch 10.

It has to be noted that the output voltages of the converter cells 10, which are provided to the phase branch 22, may be different. For example, each inverter 18 may be adapted for providing its supply voltage $U_{S\_mn}$ in both directions to the phase branch 22 and/or may be adapted for providing no voltage and/or a fraction to the supply voltage $U_{S\_mn}$ to the phase branch 22.

The converter cells 10 and in particular the inverters 18 are switched based on control signals of a controller 24, which receives a reference voltage $U_{r\_m}$, and switches the inverter cells 10 in such a way that an output voltage follows the respective reference voltage.

However, power consumed by a converter cell 10 may oscillate with the second harmonic of the output frequency. For example, if H-bridge converters with input DC link filters are used as inverters 18, then their supply voltages $U_{S\_mn}$ may vary because of the oscillating power consume. If the output voltages of the converter cells 10 and load are symmetric, the supply voltages $U_{S\_mn}$ may contain oscillations of a second harmonic of an output fundamental frequency that are shifted by 360°/M.

Thus, there may be situations, where the output voltage of a branch 22 instantaneously may not follow the respective reference voltage, because the supply voltages $U_{S\_mn}$ are too low.

FIG. 3 shows a method for controlling the electrical multi-phase converter of FIG. 2 that, for example, may be performed by the controller 24.

The method adapts the voltage references $U_{r\_m}$ to account for the varying supply voltages $U_{S\_mn}$. In particular, in order to improve the usage of the available input voltages, modified voltage references $U_{r\_m}'$ are adapted to maximal available voltages $U_{S\_m}$.

In step S10, the supply voltages $U_{S\_mn}$ of each converter cell 10 are determined. For example, the supply voltage $U_{S\_mn}$ may be the DC link voltage of the corresponding converter cell 10. The supply voltage $U_{S\_mn}$ may be measured and/or may be received from a model of the electrical system, which calculates to the supply voltages $U_{S\_mn}$. Alternatively or additionally, a DC link voltage of each converter cell 10 may be measured as supply voltage $U_{S\_mn}$.

In step S12, a maximal available voltage $U_{S\_m}$ for each phase branch is determined. The maximal available voltage $U_{S\_m}$ may be calculated as the sum of the absolute values of the supply voltages $U_{S\_mn}$ $$U_{S\_m} = \sum_{n=1}^{N} |U_{S\_mn}|$$

The sum in step S12 may be optional, when the converter 20 only comprises one converter cell 10 per phase branch 22. For the case of one converter cell 10 per branch, the maximal available voltage $U_{S\_m}$ may be the absolute value of the respective supply voltage $U_{S\_m}=|U_{S\_m1}|$.

In step S14, a potential zone 26 for each phase is determined. The potential zone 26 may be defined by an interval $[-U_{S\_m}; U_{S\_m}]$ with upper bound the maximal available voltage $U_{S\_m}$ and with lower bound the minimal available voltage, which may be the negative value of the maximal available voltage $U_{S\_m}$.

In step S16, the reference voltage $U_{r\_m}$ for each phase m provided by phase branch 22 is received. The reference voltages $U_{r\_m}$ may be provided by an outer controller loop.

In step S18, for each phase m, the respective reference voltage $U_{r\_m}$ is compared with the corresponding potential zone 26, $[-U_{S\_m}; U_{S\_m}]$.

If all the reference voltages $U_{r\_m}$ are within their potential zones 26, then the voltage references are not modified, i.e. $U_{r\_m}'=U_{r\_m}$ and the method proceeds at step S22.

If a reference voltage reference $U_{r\_p}$, where p=1,2, ... M, exceeds its potential zone 26 $[-U_{S\_p}; U_{S\_p}]$, then the method proceeds at step S20.

In step S20, an excess voltage $U_{r\_p\_ex}$ is calculated and subtracted from all the voltage references $U_{r\_m}$ to determine a modified voltage reference $U_{r\_m}'$.

The excess voltage $U_{r\_p\_ex}$ for phase p may be calculated as the difference between the reference voltages $U_{r\_p}$ and the violated bound for the respective phase ($-U_{S\_p}$ or $U_{S\_p}$). When the upper ($U_{S\_p}$) bound is violated, it is calculated as:

$$U_{r\_p\_ex}=U_{r\_p}-U_{S\_p}.$$

When the lower ($-U_{S\_p}$) bound is violated, it is calculated as:

$$U_{r\_p\_ex}=U_{r\_p}+U_{S\_p}.$$

It has to be noted that the excess voltage $U_{r\_p\_ex}$ is subtracted from each phase reference voltage $U_{r\_m}$ $$U_{r\_m}'=U_{r\_m}-U_{r\_p\_ex}, m=1,\ldots,M$$

where the index p denotes the phase, in which the bound is violated.

In such a way, the voltage references $U_{r\_p}$ violating the potential zone 26 is shifted back into the potential zone 26 and the other voltage references $U_{r\_m}$ (m≠p), are shifted such that only minimal common mode voltage is produced.

In step S22, in both cases, the modified voltage references $U_{r\_m}'$ are used for switching the converter cells. For example, the controller 24 may determine switching states of the inverters 18, such that an output voltage at the end of the phase branches 22 follows the modified voltage references $W_{r\_m}'$.

It has to be understood that the method may be repeated regularly every cycle of the controller 24, i.e. several 1000 times every second.

FIG. 4 shows curves over time (in normalized units in both voltage and time) for the maximal available voltages $U_{S\_m}$, the voltage references $U_{r\_m}$ and the modified voltage references $U_{r\_m}'$, where m=1, 2, 3. As may be seen, the potential zones 26 for each phase m vary of time and are different. Furthermore, the modified voltage references $U_{r\_m}'$ use the available potential zones 26 as far as possible and only deviate from the unmodified voltage references $U_{r\_m}$, when a potential zone 26 is violated.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 converter cell
12 filter
14 rectifier
16 DC link
18 inverter
20 multi-phase converter
22 phase branch
23 load
24 controller
26 potential zone
$U_{S\_mn}$ supply voltage of cell n in phase branch m
$U_{S\_m}$ maximal available voltage in phase branch m
$U_{r\_m}$ voltage reference for phase branch m
$U_{r\_m}'$ modified voltage reference for phase branch m
$U_{S\_p}$ maximal available voltage in phase branch p, where the potential zone is violated
$U_{r\_p}$ voltage reference for phase branch p, where the potential zone is violated
$U_{r\_p\_ex}$ excess voltage for phase branch p, where the potential zone is violated

The invention claimed is:

1. A method for controlling an electrical multi-phase converter, the electrical multi-phase converter comprising at least two phase branches for providing at least two output voltages, wherein each phase branch comprises at least one converter cell supplied with a supply voltage (US_mn), and the at least two phase branches are adapted for converting the supply voltages (US_mn) into the at least two output voltages, the method comprising:
   determining at least two supply voltages (US_mn) for the at least two converter cells of the at least two phase branches;
   determining a potential zone for each phase branch based on the at least one supply voltage (US_mn) of the at least one converter cell of the phase branch, the potential zone bounding a possible actual phase voltage producible by the phase branch;
   receiving a reference voltage (Ur_m) for each phase branch;
   if the reference voltage (Ur_m) for a phase branch is not within the potential zone of the phase branch, setting the reference voltage (U_(r_m)^') to a bound of the potential zone and shifting reference voltages of other phase branches) by:
   determining an excess voltage (Ur_p_ex) for the phase branch, the excess voltage being based on a difference between the reference voltage (Ur_p) and a violated bound of the potential zone;
   modifying the reference voltage (U_(r_m)^') for each phase branch by subtracting the excess voltage (Ur_p_ex) from the reference voltage (Ur_m) of the phase branch, such that a minimal common mode voltage between the output voltages of the multi-phase converter is generated.

2. The method of claim 1,
   wherein, for each phase branch, a maximal available voltage (US_m) at the phase branch is determined from the at least one supply voltage (US_mn) provided by the at least one converter cell of the phase branch;
   wherein the potential zone is bounded by the maximal available voltage (US_m) and the negated maximal available voltage.

3. The method of claim 2,
   wherein the electrical multi-phase converter comprises one converter cell per phase branch and the maximal available voltage (US_m) for a phase branch is the absolute value of the supply voltage (US_mn) of the one converter cell of the phase branch; or wherein the electrical multi-phase converter comprises more than one converter cell per phase branch and the maximal available voltage (US_m) for a phase branch (22) is the sum of the absolute values of the supply voltages (US_mn) of the converter cells of the phase branch.

4. The method of claim 2,
wherein the excess voltage (Ur_p_ex) is the difference between the reference voltage (Ur_p) and a violated bound based on the maximal available voltage (US_m).

5. The method of claim 2,
wherein it is determined, whether the reference voltage (Ur_m) for a phase branch is within the potential zone of the phase branch or not, by comparing, whether the reference voltage (Ur_m) is smaller than a lower bound of the potential zone and/or greater than an upper bound of the potential zone.

6. The method of claim 2,
wherein the supply voltage (US_mn) for each converter cell is measured.

7. The method of claim 2,
wherein the supply voltage (US_mn) is a DC link voltage.

8. The method of claim 2, further comprising:
determining switching states of the converter cells based on the modified reference voltages (U_(r_m)^'), such that output voltages of the phase branches (22) reproduce the modified reference voltages (U_(r_m)^').

9. A controller for controlling an electrical multi-phase converter, the electrical multi-phase converter comprising at least two phase branches for providing at least two output voltages, wherein each phase branch comprises at least one converter cell supplied with a supply voltage, and the at least two phase branches are adapted for converting the supply voltages into the at least two output voltages, wherein the controller is adapted to:
determine at least two supply voltages for the at least two converter cells of the at least two phase branches;
determine a potential zone for each phase branch based on the at least one supply voltage of the at least one converter cell of the phase branch, the potential zone bounding a possible actual phase voltage producible by the phase branch;
receive a reference voltage for each phase branch;
if the reference voltage for a phase branch is not within the potential zone of the phase branch, the controller is further adapted to set the reference voltage to a bound of the potential zone and shift reference voltages of other phase branches by:
determining an excess voltage for the phase branch, the excess voltage being based on a difference between the reference voltage and a violated bound of the potential zone;
modifying the reference voltage for each phase branch by subtracting the excess voltage from the reference voltage of the phase branch, such that a minimal common mode voltage between the output voltages of the multi-phase converter is generated.

10. An electrical multi-phase converter, comprising:
at least two phase branches for providing an output voltage;
at least two converter cells for converting at least two supply voltages into at least two output voltages; and
a controller for controlling the converter cells and adapted to:
determine at least two supply voltages for the at least two converter cells of the at least two phase branches;
determine a potential zone for each phase branch based on the at least one supply voltage of the at least one converter cell of the phase branch, the potential zone bounding a possible actual phase voltage producible by the phase branch;
receive a reference voltage for each phase branch;
if the reference voltage for a phase branch is not within the potential zone of the phase branch, the controller is further adapted to set the reference voltage to a bound of the potential zone and shift reference voltages of other phase branches by:
determining an excess voltage for the phase branch, the excess voltage being based on a difference between the reference voltage and a violated bound of the potential zone;
modifying the reference voltage for each phase branch by subtracting the excess voltage from the reference voltage of the phase branch, such that a minimal common mode voltage between the output voltages of the multi-phase converter is generated.

11. The electrical multi-phase converter of claim 10, wherein the electrical converter comprises more than one converter cell per phase branch, and the converter cells of each phase branch are series-connected at their outputs.

12. The electrical multi-phase converter of claim 10, wherein each converter cell comprises an H-bridge inverter.

13. The electrical multi-phase converter of claim 10, wherein each converter cell comprises a rectifier and an inverter, which are interconnected by a DC link, which provides a DC supply voltage for the inverter.

14. The electrical multi-phase converter of claim 10, wherein the phase branches are star-connected.

15. The method claim 3,
wherein the excess voltage is the difference between the reference voltage and a violated bound based on the maximal available voltage.

16. The method of claim 3,
wherein it is determined, whether the reference voltage for a phase branch is within the potential zone of the phase branch or not, by comparing, whether the reference voltage is smaller than a lower bound of the potential zone and/or greater than an upper bound of the potential zone.

17. The method of claim 3,
wherein the supply voltage for each converter cell is measured.

18. The method of claim 3,
wherein the supply voltage is a DC link voltage.

19. The method of claim 3, further comprising:
determining switching states of the converter cells based on the modified reference voltages, such that output voltages of the phase branches reproduce the modified reference voltages.

20. The electrical multi-phase converter of claim 11, wherein each converter cell comprises an H-bridge inverter.

* * * * *